United States Patent
Madl, III et al.

(10) Patent No.: US 9,058,239 B2
(45) Date of Patent: Jun. 16, 2015

(54) HYPERVISOR SUBPARTITION AS CONCURRENT UPGRADE

(71) Applicant: International Business Machines Corporation, Armonk, NY (US)

(72) Inventors: George V. Madl, III, Vestal, NY (US); Thomas E. Murphy, Vestal, NY (US); Fred C. Shaheen, Endwell, NY (US); Steven Shultz, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 13/923,168

(22) Filed: Jun. 20, 2013

(65) Prior Publication Data

US 2014/0380297 A1 Dec. 25, 2014

(51) Int. Cl.
*G06F 9/44* (2006.01)
*G06F 9/445* (2006.01)
*G06F 9/50* (2006.01)

(52) U.S. Cl.
CPC .... *G06F 8/67* (2013.01); *G06F 9/50* (2013.01)

(58) Field of Classification Search
USPC ............... 709/224; 711/112, 173, 1, 153; 717/173, 168–171; 718/1; 713/2
See application file for complete search history.

(56) References Cited

U.S. PATENT DOCUMENTS

| | | | |
|---|---|---|---|
| 6,330,653 B1 * | 12/2001 | Murray et al. | ................ 711/173 |
| 7,177,961 B2 | 2/2007 | Brice, Jr. et al. | |
| 7,685,251 B2 | 3/2010 | Houlihan et al. | |
| 7,826,386 B2 | 11/2010 | Beichter et al. | |
| 7,827,395 B2 * | 11/2010 | Suzuki et al. | .................... 713/1 |
| 7,984,262 B2 * | 7/2011 | Battista et al. | ................ 711/173 |
| 8,041,937 B2 * | 10/2011 | Ball et al. | ........................... 713/2 |
| 8,180,877 B2 | 5/2012 | Das et al. | |
| 8,219,988 B2 | 7/2012 | Armstrong et al. | |
| 8,327,353 B2 | 12/2012 | Traut | |
| 8,332,848 B2 * | 12/2012 | Azulay et al. | ..................... 718/1 |
| 8,352,938 B2 | 1/2013 | Hunt et al. | |
| 2004/0199632 A1 * | 10/2004 | Romero et al. | ............... 709/226 |
| 2004/0210890 A1 * | 10/2004 | Armstrong et al. | ........... 717/168 |
| 2005/0120160 A1 * | 6/2005 | Plouffe et al. | ..................... 711/1 |
| 2006/0294323 A1 * | 12/2006 | Armstrong et al. | ........... 711/153 |

(Continued)

OTHER PUBLICATIONS

Muehlbach, Andreas, et al. "Concurrent driver upgrade: Method to eliminate scheduled system outages for new function releases." 2007. IBM Journal of Research and Development 51.1.2. pp. 185-193.*

(Continued)

*Primary Examiner* — Lewis A Bullock, Jr.
*Assistant Examiner* — Gilles Kepnang
(74) *Attorney, Agent, or Firm* — Patricia B. Feighan; William Kinnaman, Jr.

(57) ABSTRACT

A processor-implemented method for a concurrent software service upgrade is provided. The processor implemented method may include receiving a type of service request corresponding to the software service upgrade, determining, by the processor, the type of service request and then generating a plurality of subpartitions corresponding to a hypervisor. The method may further include applying the service request to at least one subpartition within the plurality of subpartitions, wherein the service request is applied to the at least one subpartition based on the type of service request and balancing the system resources among the plurality of subpartitions upon the applying of the service request to the at least one subpartition.

14 Claims, 4 Drawing Sheets

(56) References Cited

U.S. PATENT DOCUMENTS

| | | | |
|---|---|---|---|
| 2007/0028228 A1* | 2/2007 | Battista et al. | 717/168 |
| 2007/0043860 A1* | 2/2007 | Pabari | 709/224 |
| 2008/0244215 A1* | 10/2008 | Flemming et al. | 711/173 |
| 2009/0178033 A1* | 7/2009 | Challener et al. | 717/168 |
| 2010/0235825 A1* | 9/2010 | Azulay et al. | 717/172 |
| 2011/0119748 A1* | 5/2011 | Edwards et al. | 726/12 |
| 2011/0197022 A1* | 8/2011 | Green et al. | 711/112 |
| 2011/0209145 A1 | 8/2011 | Chen et al. | |
| 2011/0271270 A1* | 11/2011 | Bowen | 717/171 |
| 2012/0117555 A1* | 5/2012 | Banerjee et al. | 717/168 |
| 2012/0291021 A1* | 11/2012 | Banerjee et al. | 717/173 |
| 2013/0007733 A1* | 1/2013 | Fries et al. | 718/1 |
| 2014/0229928 A1* | 8/2014 | Edstrom et al. | 717/171 |
| 2014/0282498 A1 | 9/2014 | Rosato et al. | |

OTHER PUBLICATIONS

Clarke, William J. et al. "IBM System z10 design for RAS." 2009. IBM Journal of Research and Development 53.1: pp. 11-1.*

Turk, D., et al., "Virtual Linux Servers Under z/VM: Security, Performance, and Administration Issues," IBM Systems Journal 44.2 (2005): 341-351.

* cited by examiner

HYPERVISOR SUBPARTITION AS CONCURRENT UPGRADE

FIELD OF THE INVENTION

The present invention relates generally to the field of service requests, and more particularly to concurrent service upgrades.

BACKGROUND

Currently, in a client-server computing environment, it is difficult to upgrade a control program (CP), such as system z/VM to correct known issues and to apply new function while the system continues to run uninterrupted. A very costly known solution, with unpredictable results, is to rewrite the control program. Another known proposed solution is to move all the virtual servers from a primary system to be upgraded to another system temporarily; apply the service upgrade to the primary system; and then move all the virtual servers back to the primary system once the upgrade is completed. However, there are several issues with this proposed solution. Another logical partition (LPAR) is required; the customer is required to perform a great deal of manual synchronization and management; and the primary system is "frozen" and cannot be accessed for extended periods of time since the control program is undergoing a live migration implementation.

As hardware technology (i.e., I/O devices, networking devices, etc.) changes and improves, it is critical that the control program, such as z/VM be updated to support the new hardware developments. Furthermore, it is also critical that the updates be applied in a timely manner. In the current environment, the upgrades take a great deal of time and money to be implemented. Additionally, upgrades to a large number of modules are necessary to support the new developments. This is especially true for complex systems that have existed for a while. As such, the current hardware support is falling behind as compared to the current technology that is available.

As previously stated, it would be very costly and the results would be unpredictable to restructure or rewrite the control program. Although it is a laborious task to properly upgrade the current control program, it would not be in the customer's best interest or efficiently serve the business needs of the customer to forego taking advantage of the technological hardware advancements. As such, it may be advantageous, among other things, to provide a concurrent upgrade mechanism that would allow modifications to the control program to occur while the control program continues to run uninterrupted and without requiring the need for the system to be rebooted.

SUMMARY

A processor-implemented method for a concurrent software service upgrade is provided. The processor implemented method may include receiving a type of service request corresponding to the software service upgrade, determining, by the processor, the type of service request and then generating a plurality of subpartitions corresponding to a hypervisor. The method may further include applying the service request to at least one subpartition within the plurality of subpartitions, wherein the service request is applied to the at least one subpartition based on the type of service request and balancing the system resources among the plurality of subpartitions upon the applying of the service request to the at least one subpartition.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
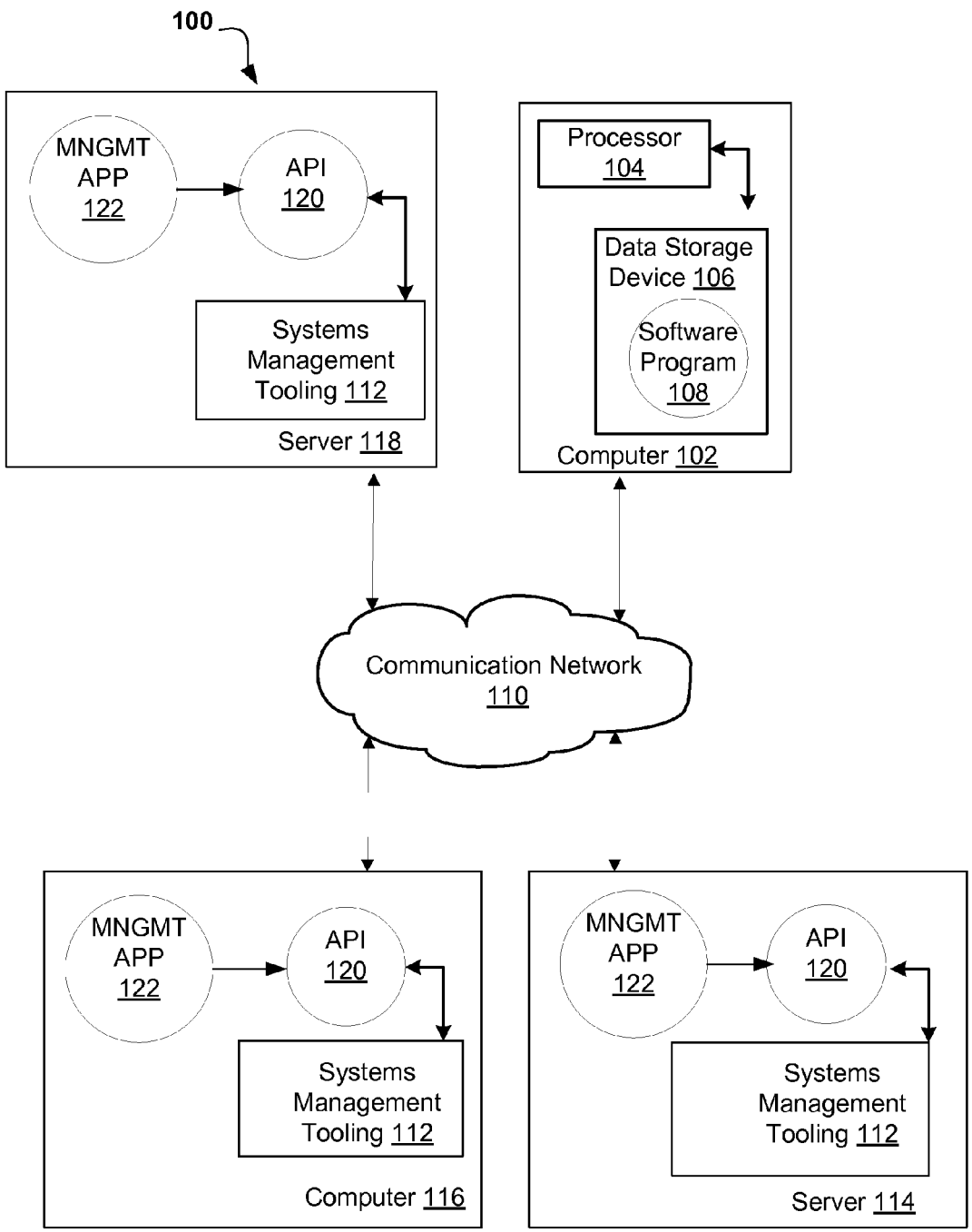
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention relates generally to field of service requests, and more particularly to concurrent service upgrades. The following described exemplary embodiments provide a system, method and program product to provide a concurrent upgrade mechanism that would allow modifications to the control program to occur while the control program continues to run uninterrupted and without requiring the need for a system reboot.

According to at least one embodiment of the present invention, multiple subpartitions are implemented to allow service requests (i.e., software upgrades) applied to the control program to be more granular. Although the method may be implemented on any operating system, one embodiment may be implemented by taking advantage of the dynamic module replacement on Linux™ and taking advantage of the live migration and related capabilities of a kernel-based virtual machine (KVM) as well as taking advantage of a subpartition that shares memory and an environment within a single logical partition.

Currently, in a client-server computing environment, it is difficult to upgrade a control program, such as system z/VM to correct known issues and to apply new function while the system continues to run uninterrupted. As previously described, hardware technology (i.e., I/O devices, networking devices, etc.) continually changes and improves, and therefore, it is critical that the control program, such as z/VM be updated to support the new hardware developments. Furthermore, it is also critical that the updates be applied in a timely manner. In the current environment, the upgrades take a great deal of time and money to be implemented. Additionally, upgrades to a large number of modules may be necessary to support the new developments. As previously described, there is currently no efficient or economical method to apply the software updates to the control program without adversely impacting the customer and their business needs.

As such, the current hardware support is falling behind as compared to the current technology that is available. Therefore, there exists a need for providing a concurrent upgrade mechanism that would allow modifications to the control program to occur while the control program continues to run uninterrupted.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following described exemplary embodiments provide a system, method and program product to provide a concurrent upgrade mechanism that would allow modifications to the control program to occur while the control program continues to run uninterrupted and without the requirement of rebooting the system. This may allow high availability systems (i.e., systems that need to be running for 24 hours everyday, uninterrupted) to continue to be accessed while the software modifications, upgrades, fixes, etc. are applied in the background. Although the method may be implemented on any operating system, a Linux™ operating system may be used for example purposes only. As such, the method may include a hypervisor that is made up of multiple subpartitions. In computing, a hypervisor or virtual machine monitor (VMM) is a piece of computer software, firmware or hardware that creates and runs virtual machines. The present embodiment may include a hypervisor that is made up of multiple subpartitions. For example purposes only, the method may include a hypervisor that is made up of three subpartitions which all share the same common memory for communication. The first subpartition may be a control program which does not run any customer virtual servers, but may provide the user with interfaces to the hypervisor and virtual servers, as well as the system's Linux™ subpartition. As such, the second subpartition may be a Linux™ micro hypervisor (MH) subpartition (a hypervisor subpartition within the hypervisor) that provides offload support, such as I/O, networking, etc. The third subpartition may be a Linux™ micro hypervisor subpartition that hosts all the customer's virtual servers.

The method may determine whether the upgrade to be made is in a module, such as Linux™, that can be dynamically upgraded. If so, then the control program may initiate that upgrade on each of the Linux™ subpartitions. If the upgrade is to one of the offload functions, then the control program may start a new offload subpartition that includes the upgrades and that uses the same common memory for communication. As such, the control program may instruct the "old" offload subpartition to stop taking new requests. Then once all the existing requests are satisfied, the "old" offload subpartition ends itself (i.e., is deleted) which makes the "old" offload's resources (i.e., CPUs, memory and devices) available for reassignment. However, if the upgrade is not in a Linux™ module or to one of the offload functions, then the control program may start a new host subpartition that includes the upgrades and that uses the same common memory for communication. As such, the control program instructs the "old" host subpartition to stop instantiating new virtual servers and move its existing virtual servers to the "new" host subpartition. This may be implemented either via a live migration environment or via a suspend/resume environment and is facilitated by the shared memory and resource space of all subpartitions. Once all the virtual servers are moved to the "new" host subpartition, the "old" host subpartition ends itself; therefore making the "old" host subpartition's resources available for reassignment.

Referring now to FIG. 1, an exemplary networked computer environment 100 in accordance with one embodiment is depicted. The networked computer environment 100 may include a client computer 102 with a processor 104 and a data storage device 106 that is enabled to run a software program 108. The networked computer environment 100 may also include another client computer 118 and computer servers 114, 118 all hosting a management application 122, an application program interface (API) 120 and a systems management tooling application 112. The networked computer environment 100 may include a plurality of computers 102, 116 and servers 114, 118 only two of which are shown. The communication network 110 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computers 102 and 116 may communicate with server computers 114 and 118 via the communications network 110. The communications network 110 may include connections, such as wire, wireless communication links, or fiber optic cables. As will be discussed with reference to FIG. 4, server computers 114 and 118 may include internal components 800 a,b and external components 900 a,b respectively and client computers 102 and 116 may include internal components 800 c,d and external components 900 c,d, respectively. Client computers 102, 116 may be, for example, a mobile device, a telephone, a personal digital assistant, a netbook, a laptop computer, a tablet computer, a desktop computer, or any type of computing device capable of running a program and accessing a network.

A software program 108 running on client computer 102 or a management application 122 running on client computer 116 or server computers 114, 118 may execute a command to an API 120 requesting a software upgrade to be performed. Then the API 120 may forward the software upgrade request to a systems management tooling application 112. The software upgrade request may be transmitted via communication network 110. According to one embodiment of the present invention, the systems management tooling application 112 may determine which subpartition needs to be upgraded and the necessary steps required to perform the upgrade. The systems management tooling process is explained in more detail below with respect to FIG. 3.

Figure 2:
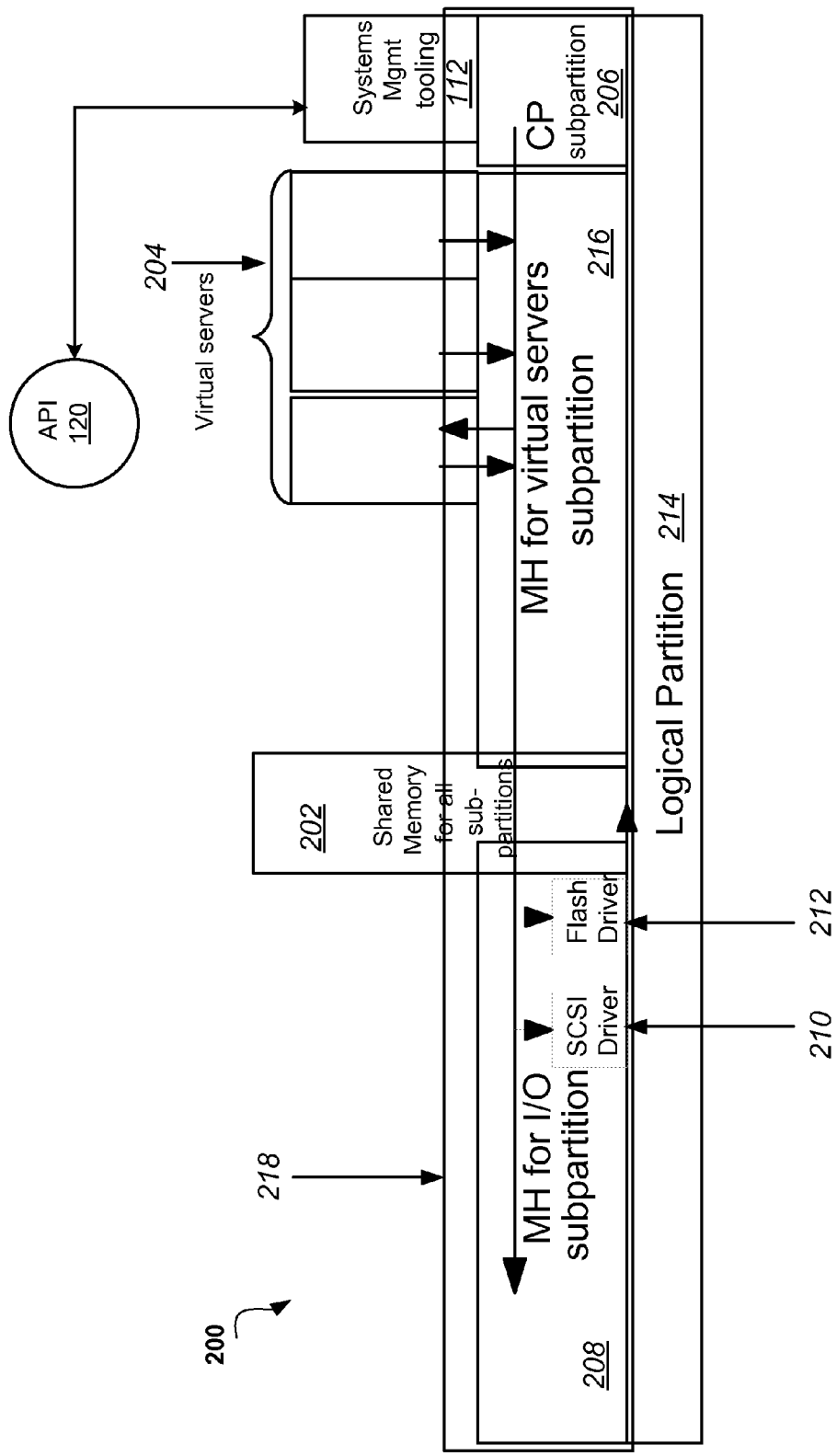
FIG. 2 illustrates the hardware that may be used in a networked computer environment with an exemplary hypervisor subpartition to be used as a concurrent upgrade mechanism according to one embodiment.

FIG. 2 illustrates the hardware that may be used in a networked computer environment with an exemplary hypervisor subpartition to be used as a concurrent upgrade mechanism according to one embodiment is depicted. As shown, the system 200 may include a logical partition 214, and a hypervisor subpartition 218 divided into multiple subpartitons (i.e., a CP subpartition 206 and micro hypervisor subpartitions 208, 216). For example purposes only, three subpartitions are depicted. There may be a micro hypervisor subpartition (i.e., a hypervisor supartition within a hypervisor subpartition) for input/output devices 208 (only two of which are shown), such as a SCSI driver 210 and a flash driver 212. The system 200 may also include a micro hypervisor subpartition for virtual servers 216 with at least one virtual server 204, a control program subpartition 206, a systems management tooling application 112 and shared memory for all the subpartitions 202.

All three of the subpartitions (i.e., the micro hypervisor for I/O 208, the micro hypervisor for virtual servers 216, and the control program 206) may run over the same logical partition 214. The logical partition 214 may represent all or a subset of the hardware existent on a computer system (such as the system 100 shown in FIG. 1), virtualized as a distinct computer. The logical partition 214 may provide one or more processors and a set of memory to the micro hypervisor for I/O 208, the micro hypervisor for virtual servers, and the control program 206.

According to one implementation of the present embodiment, the system management tooling application 112 may receive a software upgrade request from an application program interface (API) 120. Then the management tooling application 112 may determine whether the upgrade to be made is in a module, such as Linux™, that can be dynamically upgraded. If so, then the control program 206 may initiate that upgrade on each of the Linux™ subpartitions 208, 216. If the upgrade is to one of the offload functions, such as the SCSI driver 210 or the flash driver 212, then the control program 206 may start a new offload subpartition that includes the upgrades and that uses the same common memory 202 for communication. As such, the control program 206 may instruct the "old" offload subpartition 208 to stop taking new requests. Then once all the existing requests are satisfied, the "old" offload subpartition 208 ends itself (i.e., is deleted) which makes the "old" offload's resources 202 (i.e., CPUs, memory and devices) available for reassignment. However, if the upgrade is not in a Linux™ module or to one of the offload functions, then the control program 206 may start a new host subpartition that includes the upgrades and that uses the same common memory 202 for communication. As such, the control program 206 may instruct the "old" host subpartition 216 to stop instantiating new virtual servers 204 and move its existing virtual servers 204 to the "new" host subpartition. This may be implemented either via a live migration environment or via a suspend/resume environment and is facilitated by the shared memory 202 and resource space of all subpartitions. Once all the virtual servers 204 are moved to the "new" host subpartition, the "old" host subpartition 216 ends itself; therefore making the "old" host subpartition's resources 202 available for reassignment.

Figure 3:
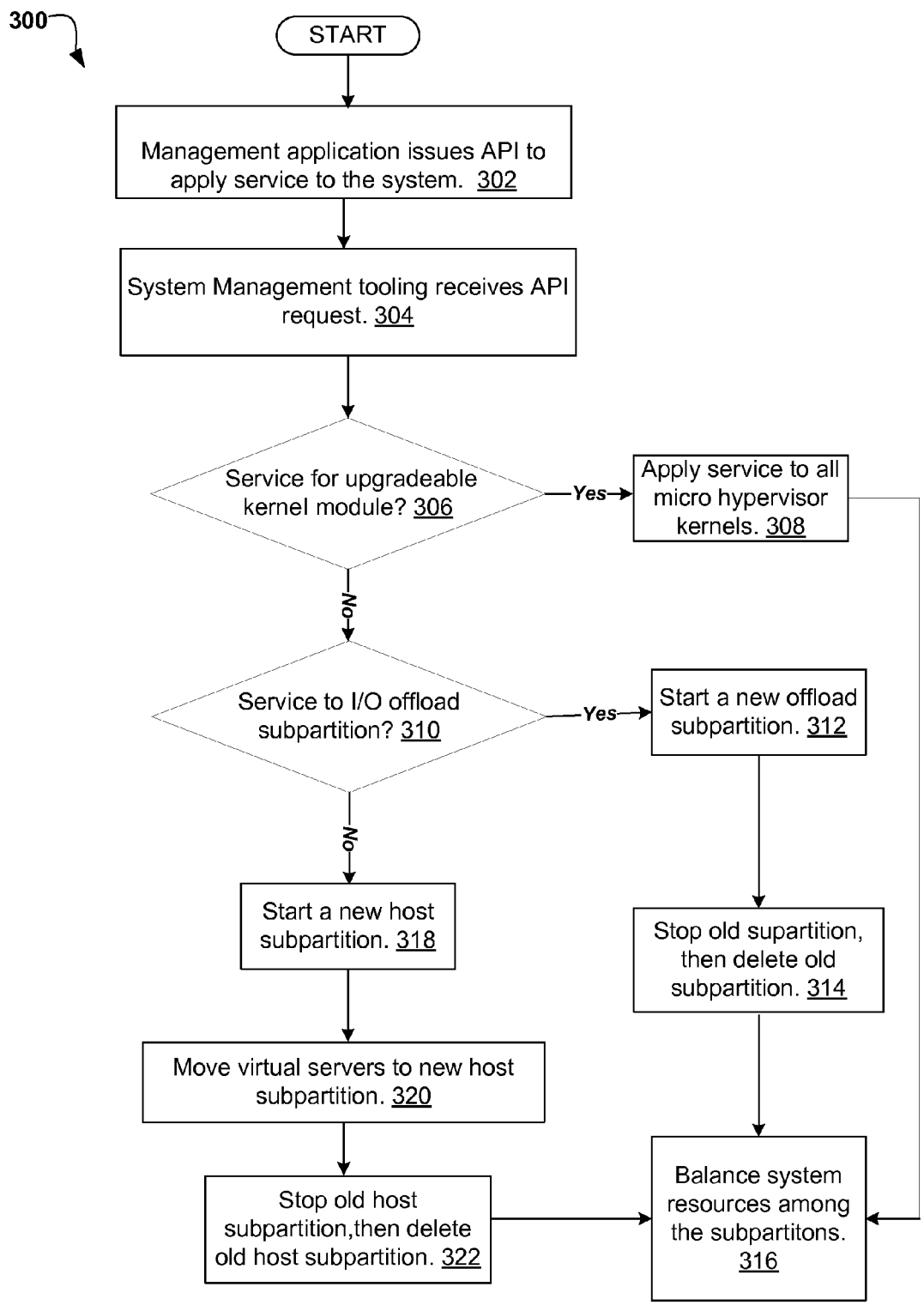
FIG. 3 is an operational flowchart illustrating the steps carried out by a hypervisor subpartition to be used as a concurrent upgrade mechanism according to one embodiment.

Referring now to FIG. 3, an operational flowchart illustrating the steps carried out by a hypervisor subpartition to be used as a concurrent upgrade mechanism according to one embodiment. At 302, a management application may issue an API to apply service to the system. For example, a management application 122 (FIG. 1) running on server computer 118 (FIG. 1) may issue an API 120 (FIG. 1) to apply a software upgrade to the system. Then, at 304, the system management tooling application 112 (FIG. 1) running on server computer 118 (FIG. 1) receives the request from the API 120 (FIG. 1).

At 306, the system management tooling application 112 (FIG. 1) determines whether the service request is for an upgradeable kernel module. As such, the management tooling application 112 (FIG. 1) may determine whether the upgrade to be made is in a module, such as Linux™, that can be dynamically upgraded. If so, then at 308, the control program 206 (FIG. 2) may initiate that upgrade to each of the micro hypervisor kernels (i.e., on each of the Linux™ subpartitions 208, 216 (FIG. 2)). Then at 316, the control program 206 (FIG. 2) balances the system resources 202 (FIG. 2) among the subpartitions (206, 208, 216 (FIG. 2)).

If, at 310, it is determined that the upgrade is to one of the I/O offload functions 208 (FIG. 2), such as the SCSI driver 210 (FIG. 2) or the flash driver 212 (FIG. 2), then at 312 the control program 206 (FIG. 2) may start a new offload subpartition that includes the upgrades and that uses the same common memory 202 (FIG. 2) for communication. Then at 314, the control program 206 (FIG. 2) may instruct the "old" offload subpartition 208 (FIG. 2) to stop taking new requests. Then once all the existing requests are satisfied, the "old" offload subpartition 208 (FIG. 2) deletes itself which, at 316, makes the "old" offload's resources 202 (FIG. 2) (i.e., CPUs, memory and devices) available for reassignment.

However, if the upgrade is not in a Linux™ module or to one of the offload functions, then at 318, the control program 206 (FIG. 2) may start a new host subpartition that includes the upgrades and that uses the same common memory 202 (FIG. 2) for communication. Then at 320, the control program 206 (FIG. 2) may move its existing virtual servers 204 (FIG. 2) to the "new" host subpartition and at 322 instruct the "old" host subpartition 216 (FIG. 2) to stop instantiating new virtual servers 204 (FIG. 2). According to the present embodiment, this may be implemented either via a live migration environment or via a suspend/resume environment and is facilitated by the shared memory 202 (FIG. 2) and resource space of all subpartitions. Once all the virtual servers 204 (FIG. 2) are moved to the "new" host subpartition at 320, then at 322, the "old" host subpartition 216 (FIG. 2) ends itself; therefore making the "old" host subpartition's resources 202 (FIG. 2) (i.e., CPUs, memory and devices) available for reassignment at 316.

Figure 4:
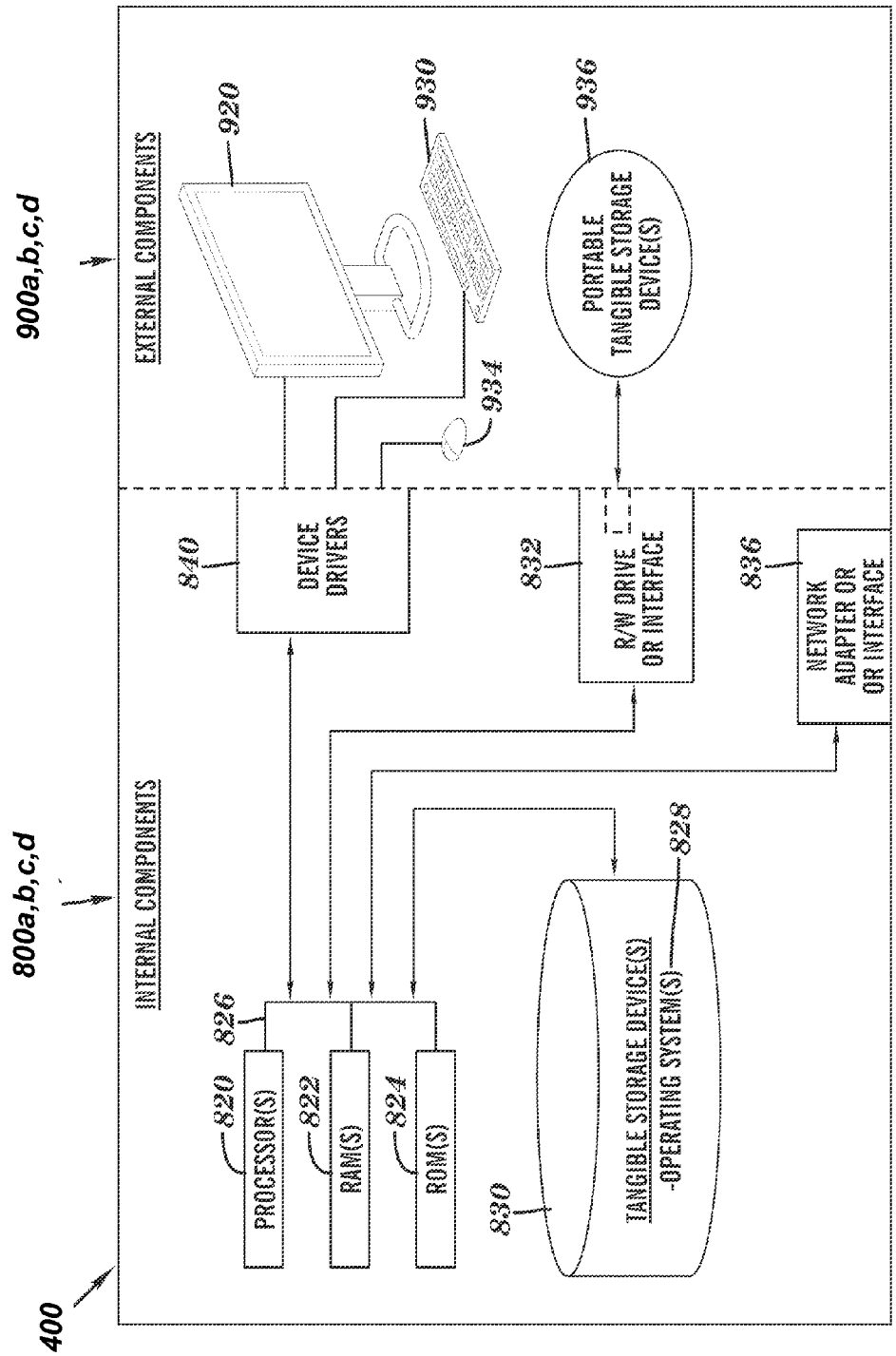
FIG. 4 is a block diagram of internal and external components of computers and servers depicted in FIG. 1.

FIG. 4 is a block diagram of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computers 102, 116 (FIG. 1), and network server computers 114, 118 (FIG. 1) include respective sets of internal components 800 *a, b, c, d* and external components 900 *a, b, c, d* illustrated in FIG. 4. Each of the sets of internal components 800 *a, b, c, d* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software program 108 (FIG. 1) in client computer 102 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a, b, c, d* also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program 108 can be stored on one or more of the respective portable computer-readable tangible storage devices 936, read via the respective R/W drive or interface 832 and loaded into the respective hard drive 830.

Each set of internal components 800 *a, b, c, d* also includes network adapters or interfaces 836 such as a TCP/IP adapter cards, wireless wi-fi interface cards, or 3G or 4G wireless interface cards or other wired or wireless communication links. A software program 108 in client computer 102 can be downloaded to client computer 102 from an external computer via a network (for example, the Internet, a local area network or other, wide area network) and respective network adapters or interfaces 836. From the network adapters or interfaces 836, the software program 108 in client computer 102 is loaded into the respective hard drive 830. The network may comprise copper wires, optical fibers, wireless transmission, routers, firewalls, switches, gateway computers and/or edge servers.

Each of the sets of external components 900 *a, b, c, d* can include a computer display monitor 920, a keyboard 930, and a computer mouse 934. External components 900 *a, b, c, d* can also include touch screens, virtual keyboards, touch pads, pointing devices, and other human interface devices. Each of the sets of internal components 800 *a, b, c, d* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive or to limit the invention to the precise form disclosed. Many modifications and variations are possible. Such modifications and variations that may be apparent to a person skilled in the art of the invention are intended to be included within the scope of the invention as defined by the accompanying claims.

What is claimed is:

1. A processor-implemented method for providing a concurrent software service upgrade, the method comprising:

receiving, by a management tool, a type of service request corresponding to the software service upgrade;

determining, by the management tool, the type of service request;

invoking, by the management tool, a control program subpartition configured to apply the service request to a plurality of subpartitions based on the type of service request, wherein the plurality of subpartitions includes at least one upgradeable micro hypervisor kernel module, micro hypervisor I/O offload subpartition and micro hypervisor host subpartition;

applying the service request to at least one subpartition within the plurality of subpartitions, wherein applying the service request to at least one subpartition comprises:

applying the service request to a plurality of micro hypervisor kernels based on the determined type of service request being associated with at least one upgradeable kernel module;

applying the service request to a micro hypervisor I/O offload subpartition based on the determined type of service request being associated with a service to an I/O offload subpartition, wherein applying the service request to the micro hypervisor I/O offload subpartition comprises generating a new I/O offload subpartition, applying the service to the generated new I/O offload subpartition, instructing an old I/O offload subpartition to stop taking new requests, determining when all existing requests are satisfied, and deleting the old offload subpartition, in response to determining that the existing requests are satisfied; and applying the service request to a micro hypervisor host subpartition based on the determined type of service request not being associated with a service to an I/O offload subpartition and the determined type of service request not being associated with the at least one upgradeable kernel module, wherein applying the service request to the micro hypervisor host subpartition comprises generating a new micro hypervisor host subpartition, moving a plurality of virtual servers from an old host subpartition to the generated new micro hypervisor host subpartition, stopping the old host subpartition, and deleting the old host subpartition; and balancing a plurality of system resources among the plurality of subpartitions upon the applying of the service request to the at least one subpartition.

2. The method of claim 1, wherein the plurality of subpartitions share memory and an environment within a single logical partition comprising the hypervisor, the hypervisor including at least one of the control program subpartition, the micro hypervisor I/O offload subpartition, and the micro hypervisor host subpartition.

3. The method of claim 1, wherein the type of service request includes at least one to the kernel module, the micro hypervisor I/O offload subpartition, and the micro hypervisor host subpartition.

4. The method of claim 1, wherein the service request includes at least one of a software upgrade, a software modification, a software update and a software fix.

5. The method of claim 1, wherein the concurrent upgrade mechanism does not require a system reboot.

6. A computer system for providing a concurrent software service upgrade, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to receive, by a management tool, a type of service request corresponding to the software service upgrade;

program instructions to determine, by the management tool, the type of service request;

program instructions to invoke, by the management tool, a control program subpartition configured to apply the service request to a plurality of subpartitions based on the type of service request, wherein the plurality of subpartitions includes at least one upgradeable micro hypervisor kernel module, micro hypervisor I/O offload subpartition and micro hypervisor host subpartition;

program instructions to apply the service request to at least one subpartition within the plurality of subpartitions, wherein applying the service request to at least one subpartition comprises:

program instructions to apply the service request to a plurality of micro hypervisor kernels based on the determined type of service request being associated with at least one upgradeable kernel module;

program instructions to apply the service request to a micro hypervisor I/O offload subpartition based on the determined type of service request being associated with a service to an I/O offload subpartition, wherein applying the service request to the micro hypervisor I/O offload subpartition comprises generating a new I/O offload subpartition, applying the service to the generated new I/O offload subpartition, instructing the old offload subpartition to stop taking new requests, determining when all existing requests are satisfied, and deleting the old offload subpartition, in response to determining that the existing requests are satisfied; and program instructions to apply the service request to a micro hypervisor host subpartition based on the determined type of service request not being associated with a service to an I/O offload subpartition and the determined type of service request not being associated with the at least one upgradeable kernel module, wherein applying the service request to the micro hypervisor host subpartition comprises generating a new micro hypervisor host subpartition, moving a plurality of virtual servers from the old host subpartition to the generated new micro hypervisor host subpartition, stooping the old host subpartition, and deleting the old host subpartition; and program instructions to balance a plurality of system resources among the plurality of subpartitions upon the applying of the service request to the at least one subpartition.

7. The computer system of claim 6, wherein the plurality of subpartitions share memory and an environment within a single logical partition comprising the hypervisor, the hypervisor including at least one of the control program subpartition, the micro hypervisor I/O offload subpartition, and the micro hypervisor host subpartition.

8. The computer system of claim 6, wherein the type of service request includes at least one to the kernel module, the micro hypervisor I/O offload subpartition, and the micro hypervisor host subpartition.

9. The computer system of claim 6, wherein the service request includes at least one of a software upgrade, a software modification, a software update and a software fix.

10. The computer system of claim 6, wherein the concurrent upgrade mechanism does not require a system reboot.

11. A computer program product for system for providing a concurrent software service upgrade, the computer program product comprising:

one or more computer-readable storage devices and program instructions stored on at least one of the one or more non-transitory tangible storage devices, the program instructions comprising:

program instructions to receive, by a management tool, a type of service request corresponding to the software service upgrade;

program instructions to determine, by the management tool, the type of service request;

program instructions to invoke, by the management tool, a control program subpartition configured to apply the service request to a plurality of subpartitions based on the type of service request, wherein the plurality of subpartitions includes at least one upgradeable micro hypervisor kernel module, micro hypervisor I/O offload subpartition and micro hypervisor host subpartition;

program instructions to apply the service request to at least one subpartition within the plurality of subpartitions, wherein applying the service request to at least one subpartition comprises:

program instructions to apply the service request to a plurality of micro hypervisor kernels based on the determined type of service request being associated with at least one upgradeable kernel module;

program instructions to apply the service request to a micro hypervisor I/O offload subpartition based on the determined type of service request being associated with a service to an I/O offload subpartition, wherein applying the service request to the micro hypervisor I/O offload subpartition comprises generating a new I/O offload subpartition, applying the service to the generated new I/O offload subpartition, instructing the old offload subpartition to stop taking new requests, determining when all existing requests are satisfied, and deleting the old offload subpartition, in response to determining that the existing requests are satisfied; and program instructions to apply the service request to a micro hypervisor host subpartition based on the determined type of service request not being associated with a service to an I/O offload subpartition and the determined type of service request not being associated with the at least one upgradeable kernel module, wherein applying the service request to the micro hypervisor host subpartition comprises generating a new micro hypervisor host subpartition, moving a plurality of virtual servers from the old host subpartition to the generated new micro hypervisor host subpartition, stopping the old host subpartition, and deleting the old host subpartition; and program instructions to balance a plurality of system resources among the plurality of subpartitions upon the applying of the service request to the at least one subpartition.

12. The computer program product of claim 11, wherein the plurality of subpartitions share memory and an environment within a single logical partition comprising the hypervisor, the hypervisor including at least one of the control program subpartition, the micro hypervisor I/O offload subpartition, and the micro hypervisor host subpartition.

13. The computer program product of claim 11, wherein the type of service request includes at least one to the kernel module, the micro hypervisor I/O offload subpartition, and the micro hypervisor host subpartition.

14. The computer program product of claim 11, wherein the service request includes at least one of a software upgrade, a software modification, a software update and a software fix.

* * * * *